United States Patent [19]

Bedell et al.

[11] Patent Number: 5,338,778
[45] Date of Patent: Aug. 16, 1994

[54] REMOVAL OF HYDROGEN SULFIDE FROM FLUID STREAMS

[75] Inventors: Stephen A. Bedell, Lake Jackson; John D. Myers, Clute, both of Tex.

[73] Assignee: The Dow Chemical Company, Midland, Mich.

[21] Appl. No.: 592,402

[22] Filed: Oct. 3, 1990

Related U.S. Application Data

[63] Continuation-in-part of Ser. No. 238,024, Aug. 29, 1988, abandoned.

[51] Int. Cl.$^5$ .............................................. C01B 17/00
[52] U.S. Cl. .................................. 423/220; 423/226; 423/230; 423/243.07; 423/573.1
[58] Field of Search ............... 423/220, 226, 228, 229, 423/230, 231, 573.1, 243.07

[56] References Cited

U.S. PATENT DOCUMENTS

| | | | |
|---|---|---|---|
| 4,483,843 | 11/1984 | Sonoda | 423/226 |
| 4,729,834 | 3/1988 | Itoh | 210/692 |
| 4,784,838 | 11/1988 | Paul et al. | 423/226 |
| 4,818,506 | 4/1989 | Lin | 423/243 |
| 4,859,437 | 8/1989 | Grinstead | 423/226 |
| 4,880,609 | 11/1989 | Naraghi | 423/567 R |
| 4,891,205 | 1/1990 | Bedell | 423/576.6 |

FOREIGN PATENT DOCUMENTS 53-14678  2/1978  Japan ................ 423/242 A

OTHER PUBLICATIONS

Webster's New Collegiate Dictionary, G & C Merriam Co., Springfield, Massachusetts, 1977, p. 306.

*Primary Examiner*—Gary P. Straub
*Assistant Examiner*—Timothy C. Vanoy

[57] ABSTRACT

$H_2S$ is removed from a fluid stream by contacting the stream with an aqueous solution having at least two components: an effective amount of an iron (III) chelate to oxidize $H_2S$ to sulfur and, an amount of a water soluble anionic polymer containing sulfonic acid groups, carboxyl groups or mixtures thereof which is effective to stabilize the chelate. During the removal process the iron chelate is reduced to iron(II) chelate, and sulfur particles are produced.

29 Claims, No Drawings

REMOVAL OF HYDROGEN SULFIDE FROM FLUID STREAMS

This application is a continuation-in-part of application Ser. No. 07-238,024, filed Aug. 29, 1988, now abandoned.

BACKGROUND OF THE INVENTION

The invention relates to a method of removing hydrogen sulfide ($H_2S$) from a fluid stream whereby the stream is treated with an aqueous solution of ferric chelates to remove substantially all of the hydrogen sulfide gas contained therein and the solution also contains an anionic polymer whereby the chelating agent is stabilized against degradation.

It is well known in the prior art that iron chelates are useful to remove $H_2S$ from sour gas streams. See for example U.S. Pat. No. 4,622,212, Columns 1 and 2. It also has been proposed that various organic compounds can be added as stabilizers for the iron chelates. This is illustrated by the following U.S. Pat. Nos. 4,382,918; 4,388,293; 4,400,368; 4,421,733; and 4,461,754.

Sonoda (U.S. Pat. No. 4,002,727) discloses an aqueous solution composition for removing hydrogen sulfide from a gas stream, in which the aqueous solution comprises iron in concentrations of 1-5000 ppm, possibly in the form of iron-EDTA. Additionally, the aqueous solution of Sonoda et al. comprises 0.1-10 g/1 of a water-soluble anionic polymer such as polymethacrylic acid (column 5, line 5), and the sodium salts thereof. The Sonoda process requires the use of a water soluble derivative of anthraquinone or naphthoquinone such as naphthoquinone sulfonate and anthraquinone disulfonic acid. The present process is quite different from the Sonoda process because the present invention does not occur in the presence of a water soluble derivative of anthraquinone or naphthoquinone such as naphthoquinone sulfonate and anthraquinone disulfonic acid.

SUMMARY OF THE INVENTION

The present invention is a process which utilizes an iron chelate solution for removing $H_2S$ from a sour gas stream wherein the iron chelate solution contacts the sour gas and it is inhibited from degradation by the addition of an effective amount of an anionic polymer. A further aspect of the invention is a composition comprising an aqueous solution of the iron chelate and the anionic polymer. The present invention is conducted in the absence of a water soluble derivative of anthraquinone or naphtoquinone such as naphtoquinone sulfonate and anthraquinone disulfonic acid.

The process of this invention has the following steps:
A) contacting said stream in a contacting zone with an aqueous solution having at least two components and not containing a water soluble derivative of anthraquinone or naphthoquinone such as naphthoquinone sulfonate and anthraquinone disulfonic acid, said solution containing:
  (1) an effective amount of an iron (III) chelate to [reduce] oxidize $H_2S$ to sulfur, as a first component, and
  (2) as a second component, an amount of a water soluble anionic polymer containing sulfonic acid groups, carboxyl groups or mixtures thereof which is effective to stabilize said chelate, whereby said iron (III) chelate in said solution is reduced to an iron (II) chelate, a purified gas stream is produced, and sulfur particles are produced.
B) regenerating said reduced iron chelate in an oxidizing zone,
C) removing at least a portion of said sulfur particles, and
D) recycling said regenerated iron chelate to said contacting zone.

The advantage of the present invention over the use of organic compounds known to inhibit degradation is that instead of using about 1.0 to about 5.0 percent by weight of an organic compound, a much smaller amount of the anionic polymers can be used in the range of parts per million.

The present invention is useful in a variety of processes including the treatment of geothermal streams.

DETAILED DESCRIPTION OF THE INVENTION

Chelating agents useful in preparing the ferric chelate of the present invention include those chelating or complexing agents which form a water-soluble chelate. Representative of such chelating agents are the aminocarboxylic acids, such as nitrilotriacetic acid, N-hydroxyethyliminodiacetic acid, ethylenediaminetetraacetic acid, N-hydroxyethylethylenediaminetriacetic acid, diethylenetriaminepentaacetic acid, cyclohexanediaminetetraacetic acid, triethylenetetraaminehexaacetic acid and the like, including the salts thereof.

Further examples of useful chelating agents are aminophosphonic acids such as ethylenediamine tetra(methylenephosphonic acid), aminotri(methylene phosphonic acid), diethylenetriaminepenta(methylene phosphonic acid); phosphonic acids such as 1-hydroxy ethylidene-1,1-diphosphonic acid, 2-phosphonoacetic acid, 2-phosphonopropionic acid, and 1-phosphonoethane 1,2-dicarboxylic acid; polyhydroxy chelating agents such as monosaccharides and sugars (e.g., disaccharides such as sucrose, lactose and maltose) sugar acids (e.g., gluconic or glucoheptanoic acid); other polyhydric alcohols such as sorbitol and mannitol; and the like.

Other useful chelating agents are lignosulfonates and triethanolamine.

Of such chelating agents, ethylenediaminetetraacetic acid, N-hydroxyethylethylenediaminetriacetic acid and nitrilotriacetic acid, are most advantageously employed in preparing the ferric chelate used herein.

The chelated iron concentrations in the circulating solution should be in the range of from 100 to 50,000 parts per million (ppm) of iron and preferably in the range from 1,000 to 10,000 ppm.

The circulation rate of the chelate solution depends upon the hydrogen sulfide level in the circulation fluid. In general, the circulation rate should be sufficient to provide 1 to 6 moles and preferably 2 to 4 moles of ferric chelate for every mole of $H_2S$ entering the reaction zone. A lower circulation rate can be used with a higher ferric chelate concentration.

Examples of useful water soluble anionic polymers containing sulfonic acid groups, carboxyl groups or mixtures thereof to be used in this invention are poly(styrenesulfonic acid) sodium salt, copolymers of sodium styrene sulfonate with acrylamide, and homopolymers of poly(ethylenesulfonic acid) and copolymers thereof with acrylamide.

A preferred group of water soluble anionic polymers are (meth)acrylamide/(meth)acrylic acid polymers. Examples or these are (1) polyacrylic or polymethacrylic acids or their salts, (2) partially hydrolyzed polyacrylamides or polymethacrylamides, (3) copolymers of acrylic or methacrylic acid or their salts with acrylamide or methacrylamide, (4) copolymers of vinylsulfonic acid or its salts with acrylamide or methacrylamide, (5) terpolymers of 2-acrylamido-2-methyl-propanesulfonic acid salt with acrylic or methacrylic acid salt and acrylamide or methacrylamide. These anionic polymers are well known and are commercially available under various trade names. See, for example, Belgian patent 628,018; U.S. Pat. Nos. 2,909,508; 3,617,572; 4,479,879 which are incorporated by reference herein.

The foregoing anionic polymers act as negative catalysts and are used in the circulating solution at a rate in the range from 0.0001 to 0.2 parts per part of iron. It is to be understood that the above range is considered to be an effective amount of the catalyst. The use of amounts less than the above range does not generally have the desired effect. The use of amounts more than the above range is not economical. A preferred range is 0.002 to 0.1 parts per part of iron. The most preferred range is 0.01 to 0.04 parts per part of iron.

The contact time of the gas streams with the aqueous solution should be at least 0.05 second or more and preferably in the range from 0.2 to 1.0 seconds.

The pH of the ferric chelate solution should be in the range from 6 to 11 and preferably in the range from 7.0 to 9.0 although we have shown degradation to be lower at high pH we seldom ran this high. Below the pH level of 6, the $H_2S$ removal is inadequate and above the level of 11 the solution does not retain the ferric chelate in soluble form.

In general, an aeration tank or vessel must be provided having a capacity such that there is a residence time of the chelate solution in the range from 0.1 to 5 hours and preferably in the range from 0.5 to 2 hours. In the oxidation zone, air or an oxygen containing gas is sparged in at a rate to provide at least 0.5 mole of oxygen per mole of $H_2S$ being treated. In general, the ratio is from 0.6 to 20.0 moles of oxygen per mole of $H_2S$ and preferably the rate is 1.0 to 10.0 moles of oxygen per mole of $H_2S$. The zone in which the materials are contacted can be in the same vessel as the oxidation zone, or it may be in a different vessel from the oxidation zone.

A method for removing solid sulfur must be provided at any convenient point in the flowing circuit. Any suitable method can be employed, including but not limited to, filtration, settling or melting. Sulfur may be removed completely on each pass of the solution through the system or, alternatively, only a portion of the sulfur may be removed, thus allowing solid sulfur to accumulate in the solution to a tolerable limit.

The reactions described in the present invention are conducted in the absence of a water soluble derivative of anthraquinone or naphthoquinone such as naphthoquinone sulfonate and anthraquinone disulfonic acid.

The following examples and controls are presented to further illustrate but not limit the invention.

CONTROL 1

Into a two-liter vessel are added the following components: 71.5 g $Na_2B_4O_7 \cdot 10H_2O$, 65.3 g $K_2HPO_4$, 1350 ml $H_2O$ and 150 ml of a 5% $Fe(NO_3)_3$ solution complexed with hydroxyethylethylenediaminetriacetic acid (HEDTA). After dissolution of the above components, air and a 5% $H_2S$ (remainder nitrogen) mixture are sparged into the stirred solution simultaneously at the rates of 44 SCFH (standard cubic feet per hour) and 0.5 SCFH, respectively. After approximately 12 hours, the gas flows are stopped and samples taken during the run are analyzed for HEDTA ligand.

EXAMPLES 1-6

The control was repeated but with various amounts of the sodium salt of a low charge density polyacrylamide-acrylic acid copolymer having about 4.8 mole percent of acrylic acid commercially available as a hydrocarbon emulsion (Jayfloc TM 803 from Exxon Chemicals). The results are set forth in Table 1

TABLE 1

| Run | Additive (ppm) | Additive (ppm of active ingredient) | Parts active ingredient per part of Fe | $Na_3HEDTA$ Ligand Loss Rate (ppm/hr) |
|---|---|---|---|---|
| control | 0 | 0 | 0 | 1002 |
| Ex 1 | 43 | 15 | 0.003 | 1018 |
| Ex 2 | 85 | 29 | 0.0058 | 982 |
| Ex 3 | 148 | 51 | 0.0102 | 743 |
| Ex 4 | 213 | 73 | 0.0146 | 534 |
| Ex 5 | 425 | 146 | 0.0292 | 530 |
| Ex 6 | 851 | 293 | 0.0586 | 480 |

The data in Table 1 show that effective degradation inhibition can be achieved with small concentrations (parts per million) of additives. This implies that the inhibition mechanism is different than for inhibitors disclosed in Ser. No. 831,969, now U.S. Pat. No. 4,891,205 issued Jan. 2, 1990 which is a continuation-in-part of Ser. No. 831,969, which required relatively large concentrations (such as 5 weight %) of sacrificial radical scavengers. Table 1 also shows that large concentrations of the copolymer have minimum effects on further reduction of degradation.

EXAMPLES 7 AND 8

Examples 1-6 were repeated with a medium charge density polyacrylamide-acrylic acid copolymer having about 9.5 mole percent of acrylic acid (Jayfloc TM 808). The results are set forth in Table 2.

CONTROL 2

Control 1 was repeated using sodium thiosulfate as an inhibitor. This is a known inhibitor as is set forth in U.S. Pat. No. 4,622,212. The results are set forth in Table 2.

TABLE 2

| Run | Additive (ppm) | Additive (ppm of active ingredient) | Parts active ingredient per part of Fe | $Na_3HEDTA$ Ligand Loss Rate (ppm/hr) |
|---|---|---|---|---|
| Ex 7 | 24 | 16 | 0.003 | 594 |
| Ex 8 | 54 | 36 | 0.007 | 386 |
| Cntrl 2 | 67,714 | 67,714 | 13.5 | 510 |

The data in Table 2 show that lesser amounts of the medium charge density polymer can be more effective at inhibition than the low charge density material. Furthermore, control shows that over 2000 times as much of the thiosulfate must be used to get the same effect as for a polyacrylamide-acrylic acid copolymer.

We claim:

1. A process for the removal of H$_2$S from a fluid stream which comprises the steps of
   A) contacting said stream in a contacting zone with an aqueous solution having at least two components and not containing a water soluble substance structurally related to anthraquinone or naphthoquinone and derivable from anthraquinone or naphthoquinone, said solution containing:
      (1) an effective amount of an iron (III) chelate to oxidize H$_2$S to sulfur, as a first component, and
      (2) as a second component, an amount of a water soluble anionic polymer containing sulfonic acid groups, carboxyl groups or mixtures thereof which is effective to stabilize said chelate,
   whereby said iron chelate in said solution is reduced to an iron (II) chelate, a purified gas stream is produced, and sulfur particles are produced,
   B) regenerating said reduced iron chelate in an oxidizing zone,
   C) removing at least a portion of said sulfur particles, and
   D) recycling said regenerated iron chelate to said contacting zone.

2. The process as set forth in claim 1 wherein said fluid stream is a geothermal stream.

3. The process as set forth in claim 1 wherein said fluid stream is a sour gas stream.

4. A process for the removal of H$_2$S from a fluid stream which comprises the steps of
   A) contacting said stream in a contacting zone with an aqueous solution having at least two components and not containing a water soluble substance structurally related to anthraquinone or naphthoquinone and derivable from anthraquinone or naphthoquinone, said solution containing
      (1) an effective amount of an iron (III) chelate to oxidize H$_2$S to sulfur, as a first component, and
      (2) as a second component, an amount of a water soluble (meth)acrylamide and/or (meth)acrylic acid polymer effective to minimize degradation of substantial amounts of the iron (III) chelate,
   whereby said iron chelate in said solution is reduced to an iron (II) chelate, a purified gas stream is produced, and sulfur particles are produced,
   B) regenerating said reduced iron chelate in an oxidizing zone,
   C) removing at least a portion of said sulfur particles, and
   D) recycling said regenerated iron chelate to said contacting zone.

5. The process as set forth in claim 1 wherein said fluid stream is a geothermal stream.

6. The process as set forth in claim 1 wherein said fluid stream is a sour gas stream.

7. A process for the removal of H$_2$S from a sour gas stream which comprises the steps of
   A) contacting said stream in a contacting zone with an aqueous solution having at least two components and not containing a water soluble substance structurally related to anthraninone or naphthoquinone and derivable from anthraquinone or naphthoquinone, said solution containing
      (I) 0.01 to 5.0 weight percent of iron (III) in the chelated form, as a first component, and
      (II) as a second component, 0.1 to 10,000 parts per million of a water soluble anionic polymer selected from the group consisting of
         (1) polyacrylic or polymethacrylic acids or their salts,
         (2) partially hydrolyzed polyacrylamides or polymethacrylamides,
         (3) copolymers of acrylic or methacrylic acid or their salts with acrylamide or methacrylamide,
         (4) copolymers of vinylsulfonic acid or its salts with acrylamide or methacrylamide, and
         (5) terpolymers of 2-acrylamido-2-methylpropanesulfonic acid salt with acrylic or methacrylic acid salt and acrylamide or methacrylamide
   whereby said iron chelate in said solution is reduced to an iron (II) chelate, a purified gas stream is produced, and sulfur particles are produced,
   B) regenerating said reduced iron chelate in an oxidizing zone,
   C) removing at least a portion of said sulfur particles, and
   D) recycling said regenerated iron chelate to said contacting zone.

8. An aqueous solution for removing hydrogen sulfide from gas streams having at least two components and not containing a water soluble substance structurally related to anthraquinone or naphthoquinone and derivable from anthraquinone or naphthoquinone, said solution comprising:
   A) 0.01 to 5.0 weight percent of chelated iron (III), as a first component, and
   B) as a second component, 0.1 to 10,000 parts per million of a water soluble anionic polymer containing sulfonic acid groups, carboxyl groups or mixtures thereof at a level effective to minimize degradation of substantial amounts of the iron (III) chelate.

9. An aqueous solution for removing hydrogen sulfide from gas streams having at least two components and not containing a naphthoquinone compound, said solution comprising
   A) 0.01 to 5.0 weight percent of chelated iron (III), as a first component, and
   B) as a second component, 0.1 to 10,000 parts per million of a water soluble anionic polymer (meth)acrylamide and/or (meth)acrylic acid polymer.

10. An aqueous solution for removing hydrogen sulfide from gas streams having at least two components and not containing a naphthoquinone compound, said solution comprising
    A) 0.01 to 5.0 weight percent of chelated iron (III) as a first component, and
    B) as a second component, 0.1 to 10,000 parts per million of a water soluble anionic polymer selected from the group consisting of
       (1) polyacrylic or polymethacrylic acids or their salts,
       (2) partially hydrolyzed polyacrylamides or polymethacrylamides,
       (3) copolymers of acrylic or methacrylic acid or their salts with acrylamide or methacrylamide,
       (4) copolymers of vinylsulfonic acid or its salts with acrylamide or methacrylamide, and
       (5) terpolymers of 2-acrylamido-2-methylpropanesulfonic acid salt with acrylic or methacrylic acid salt and acrylamide or methacrylamide.

11. A process for the removal of H$_2$S from a fluid stream which comprises the steps of A) contacting said stream in a contacting zone with an aqueous solution having at least two components and not containing a water soluble substance structurally related to anthraquinone or naphthoquinone and derivable from anthraquinone or naphthoquinone, said solution containing
   (1) an effective amount of an iron (III) chelate to oxidize $H_2S$ to sulfur, as a first component, and
   (2) as a second component, an amount of a water soluble anionic copolymer of the sodium salt of acrylic acid with acrylamide whereby said iron chelate in said solution is reduced to an iron (II) chelate, a purified gas stream is produced, and sulfur particles are produced,
B) regenerating said reduced iron chelate in an oxidizing zone,
C) removing at least a portion of said sulfur particles, and
D) recycling said regenerated iron chelate to said contacting zone.

12. The process as set forth in claim 11 wherein said anionic copolymer has about 4.8 mole percent of the sodium salt of acrylic acid.

13. The process as set forth in claim 11 wherein said anionic copolymer has about 9.5 mole percent of the sodium salt of acrylic acid.

14. The process as set forth in claim 11 wherein said chelated iron is the chelate of iron (III) with hydroxyethylethylenediaminetriacetic acid.

15. The process as set forth in claim 11 wherein said fluid stream is a geothermal stream.

16. The process as set forth in claim 11 wherein said fluid stream is a sour gas stream.

17. A process for the removal of $H_2S$ from a sour gas stream which comprises the steps of
A) contacting said stream in a contacting zone with an aqueous solution having at least two components and not containing a water soluble substance structurally related to anthraquinone or naphthoquinone and derivable from anthraquinone or naphthoquinone, said solution containing
   (1) 0.01 to 5.0 weight percent of iron (III) in the chelated form, as a first component, and
   (2) as a second component, 0.1 to 10,000 parts per million of a water soluble anionic copolymer of the sodium salt of acrylic acid with acrylamide whereby said iron chelate in said solution is reduced to an iron (II) chelate, a purified gas stream is produced, and sulfur particles are produced,
B) regenerating said reduced iron chelate in an oxidizing zone,
C) removing at least a portion of said sulfur particles, and
D) recycling said regenerated iron chelate to said contacting zone.

18. The process as set forth in claim 17 wherein said anionic copolymer has about 4.8 mole percent of the sodium salt of acrylic acid.

19. The process as set forth in claim 17 wherein said anionic copolymer has about 9.5 mole percent of the sodium salt of acrylic acid.

20. The process as set forth in claim 17 wherein said chelated iron is the chelate of iron (III) with hydroxyethylethylenediaminetriacetic acid.

21. The process as set forth in claim 17 wherein said fluid stream is a geothermal stream.

22. The process as set forth in claim 17 wherein said fluid stream is a sour gas stream.

23. An aqueous solution for removing hydrogen sulfide from gas streams having at least two components and not containing a water soluble substance structurally related to anthraquinone or naphthoquinone and derivable from anthraquinone or naphthoquinone, said solution comprising
A) 0.01 to 5.0 weight percent of chelated iron (III), as a first component, and
B) as a second component, 0.1 to 10,000 parts per million of a water soluble anionic copolymer of the sodium salt of acrylic acid with acrylamide.

24. The aqueous solution as set forth in claim 23 wherein said anionic copolymer has about 4.8 mole percent of the sodium salt of acrylic acid.

25. The aqueous solution as set forth in claim 23 wherein said anionic copolymer has about 9.5 mole percent of the sodium salt of acrylic acid.

26. The aqueous solution as set forth in claim 23 wherein said chelated iron is the chelate of iron (III) with hydroxyethylethylenediaminetriacetic acid.

27. An aqueous solution for removing hydrogen sulfide from gas streams having at least two components and not containing naphthoquinone, said solution comprising
A) 0.1 to 1.0 weight percent of the chelate of iron (III) with hydroxyethylethylenediaminetriacetic acid, as a first component and
B) as a second component, 0.1 to 10,000 parts per million of a water soluble anionic copolymer of the sodium salt of acrylic acid with acrylamide.

28. The aqueous solution as set forth in claim 27 wherein said anionic copolymer has about 4.8 mole percent of the sodium salt of acrylic acid.

29. The aqueous solution as set forth in claim 27 wherein said anionic copolymer has about 9.5 mole percent of the sodium salt of acrylic acid.

* * * * *